(12) United States Patent
Nilsson

(10) Patent No.: US 6,616,028 B2
(45) Date of Patent: Sep. 9, 2003

(54) DEVICE FOR LOCKING A CATCH IN A STAPLER

(75) Inventor: Gunnar Nilsson, Hestra (SE)

(73) Assignee: Isaberg Rapid AB, Hestra (SE)

( * ) Notice: Subject to any disclaimer, the term of this patent is extended or adjusted under 35 U.S.C. 154(b) by 0 days.

(21) Appl. No.: 09/897,385

(22) Filed: Jul. 3, 2001

(65) Prior Publication Data

US 2002/0027318 A1 Mar. 7, 2002

(30) Foreign Application Priority Data

Jul. 4, 2000 (SE) .............................. 0002517

(51) Int. Cl.⁷ .............................. B25C 7/00
(52) U.S. Cl. ...................... 227/151; 227/5; 227/154; 227/156
(58) Field of Search ............... 227/7, 5, 6, 151, 227/154, 156

(56) References Cited

U.S. PATENT DOCUMENTS

| 589,046 | A | * | 8/1897 | Terry | 269/170 |
| 836,303 | A | * | 11/1906 | Christensen | 108/148 |
| 1,203,071 | A | * | 10/1916 | Straub | 248/410 |
| 1,915,340 | A | * | 6/1933 | Van Berkel | 269/170 |
| 2,170,900 | A | * | 8/1939 | Jandus et al. | 188/67 |
| 2,415,303 | A | * | 2/1947 | Moore | 269/167 |
| 4,057,239 | A | * | 11/1977 | Hopf et al. | 269/170 |
| 4,291,868 | A | * | 9/1981 | Giles | 269/152 |
| 4,832,325 | A | * | 5/1989 | Okolischan et al. | 269/305 |
| 4,957,235 | A | * | 9/1990 | Beno et al. | 108/25 |
| 4,989,847 | A | * | 2/1991 | Chapman | 269/170 |
| 5,853,168 | A | * | 12/1998 | Drake | 269/170 |
| 6,382,608 | B1 | * | 5/2002 | Michell | 269/170 |

FOREIGN PATENT DOCUMENTS

| GB | 1137243 | 12/1968 |
| WO | WO 88/08932 | 11/1988 |

* cited by examiner

Primary Examiner—Rinaldi I. Rada
Assistant Examiner—Paul Durand
(74) Attorney, Agent, or Firm—Miles & Stockbridge P.C.

(57) ABSTRACT

A locking device in a stapler adapted to lock a displaceable member carrying a catch for an object to be stapled in an optional position along a bar. The bar extends through a hole in a locking element. The locking element is connected to the displaceable member and is tiltable along the bar from a pinch position in which the locking element is pinched to the bar to a free position in which the locking element is free from the bar. The locking element is spring-biased towards its pinch position. An operating handle mounted on the displaceable member and operable outside the stapler is displaceable to a limited extent relative to the displaceable member. Exerting a forward force on the handle moves the displaceable member forward. Exerting a backward force on the handle tilts the locking element to its free position, whereby the displaceable member moves backward, and removing the force causes the locking element to return to the pinch position, thereby locking the displaceable member against further backward displacement.

18 Claims, 6 Drawing Sheets

DEVICE FOR LOCKING A CATCH IN A STAPLER

FIELD OF THE INVENTION

The present invention relates to a device which is arranged in a stapler for locking a member displaceable along a bar in an optional displacement position, said member carrying a catch for the object to be stapled, and said device having a locking means connected to the displaceable member and displaceable together with the same, said locking means having a through hole, through which the bar extends and which is designed such that the locking means is tiltable along the bar between a front position, pinch position, in which the locking means portion defining the hole engages the bar and pinches the locking means thereto, and a rear position, free position, in which this hole defining portion goes clear of the bar, the locking means being spring-biased towards its pinch position.

BACKGROUND ART

A device of this type is known from WO 88/08932. In this prior-art device, the locking means consists of a washer which is non-rotatably connected to the bar. The bar is turnable back and forth in order to tilt the washer between its free position and its pinch position. The bar extends along the stapler and protrudes at the front thereof. An operating knob is fixed to the projecting front end of the bar. A torsion spring is arranged to bias the bar towards a turning position, in which the bar keeps the washer in its pinched position. The known device has a relatively complicated construction in that it consists of many components. However, it has above all the drawback that when operating the device the user must use both hands, viz. his one hand to seize the operating knob and turn the bar and his other hand to displace the displaceable member along the bar.

SUMMARY OF THE INVENTION

The object of the present invention therefore is to provide a locking device, whose construction is simple and which is operable by means of one hand only.

According to the present invention, this object is achieved by a device which is of the type described by way of introduction and characterized in that the device further has an operating handle which is mounted on the displaceable member and operable from the outside of the stapler, said operating handle being displaceable to a limited extent in relation to the displaceable member essentially parallel with the bar in order to move, in connection with forwards displacement, the displaceable member and, thus, the catch forwards along the bar and in order to be engaged, in connection with backwards displacement, with the locking means and tilt the same towards its free position and thereby move the displaceable member and, thus, the catch backwards along the bar.

The locking means preferably is a blade shaped arm, which is tiltably fixed in the displaceable member at its one end and is arranged to cooperate with the operating handle at its other end.

In a preferred embodiment, the hole extends through the arm perpendicular to the plane sides thereof, and the arm extends essentially perpendicular to the bar in its free position.

The arm advantageously consists of a piece of sheet metal.

The operating handle is preferably displaceable relative to the displaceable member between a front end position, in which it engages the displaceable member in order to displace this forwards, and a rear end position, in which it retains the locking means in its free position.

The operating handle is suitably spring-biased towards its front position.

DESCRIPTION OF A PREFERRED EMBODIMENTS

Figure 1:
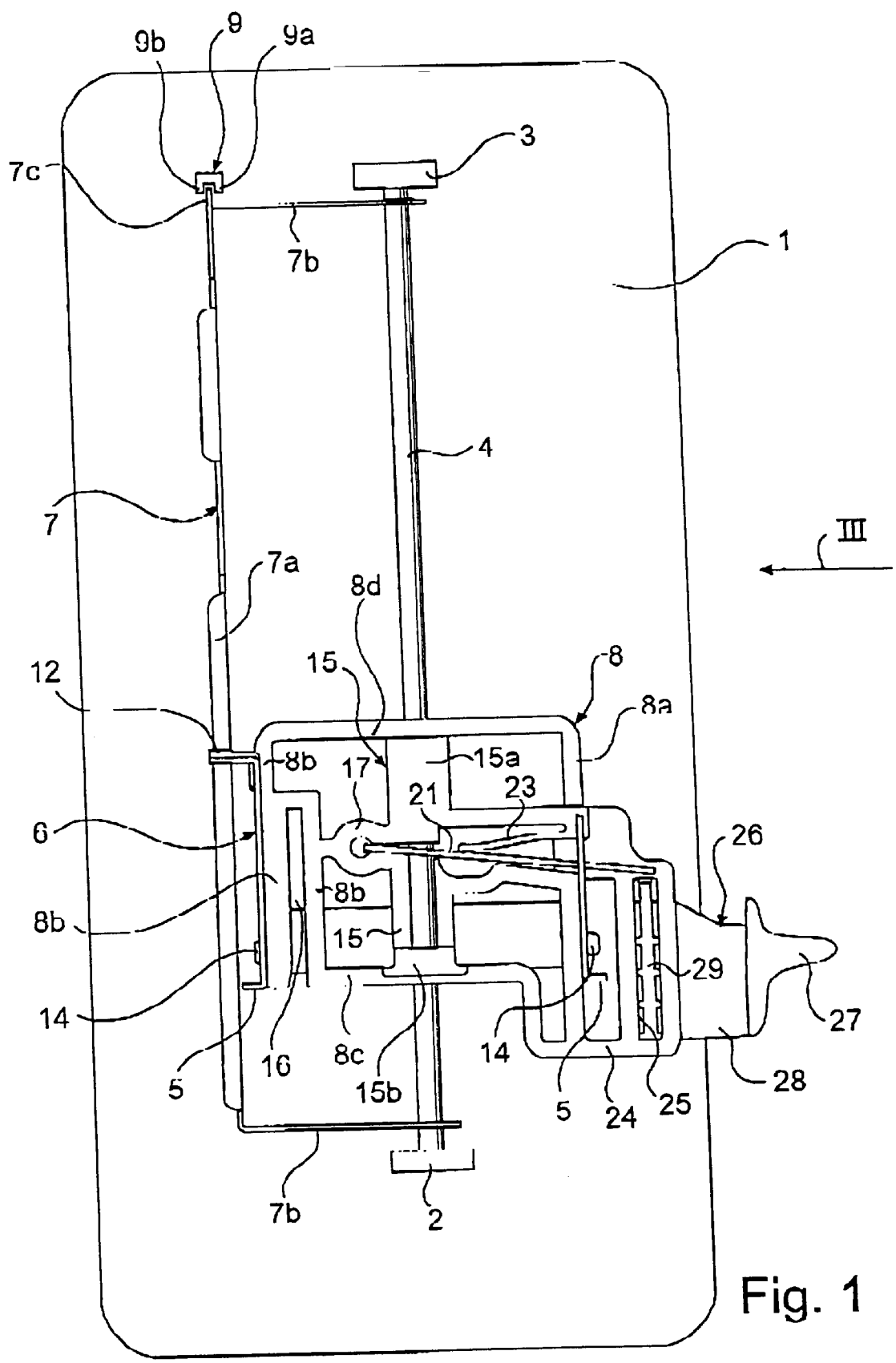
FIG. 1 is a top plan view and shows an electric stapler provided with a locking device according to the invention, the top part of the stapler being removed and a locking means included in the locking device shown in a pinch position.
Figure 2:
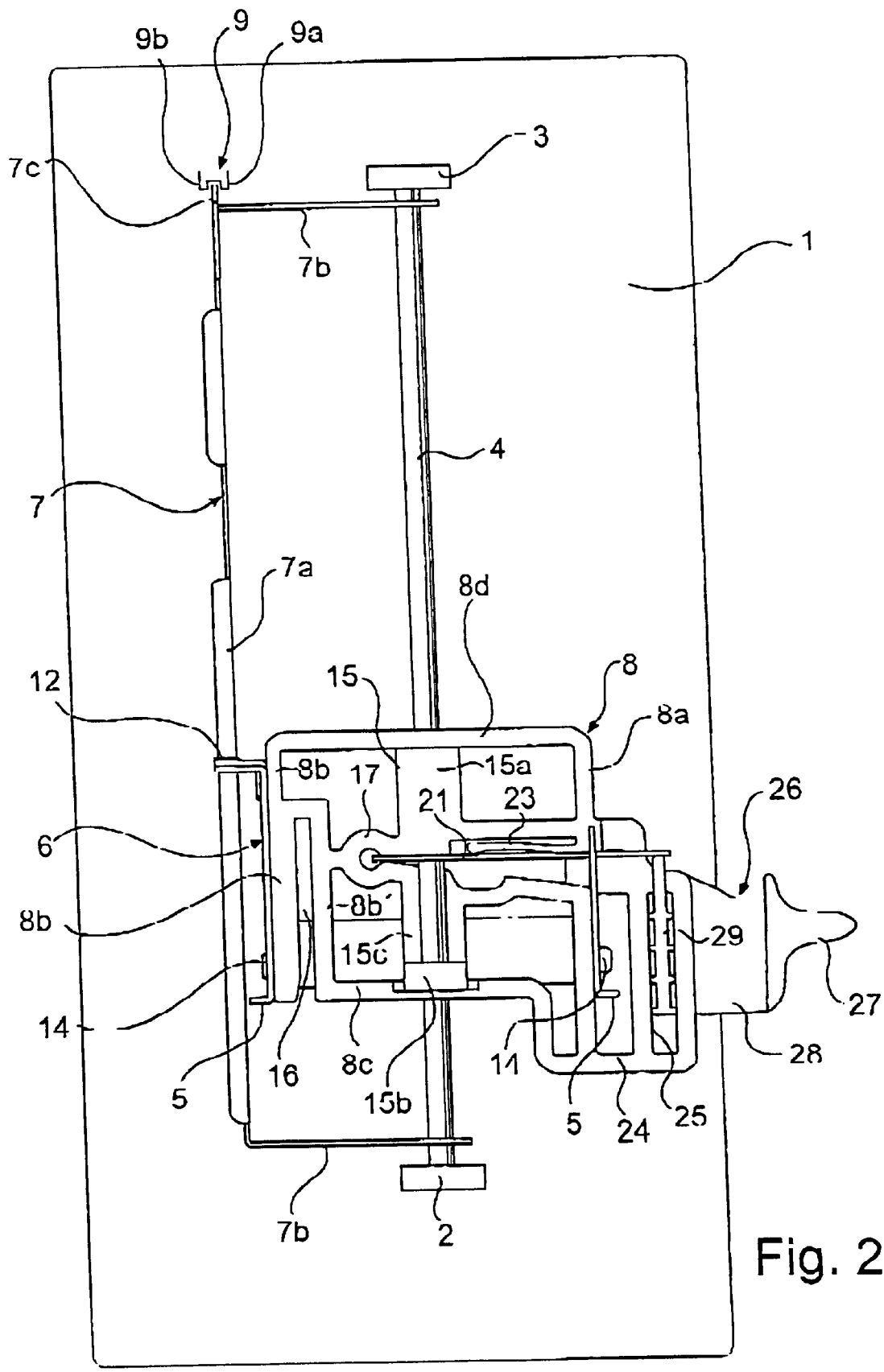
FIG. 2 corresponds to FIG. 1 but shows the locking means in a free position.
Figure 3:
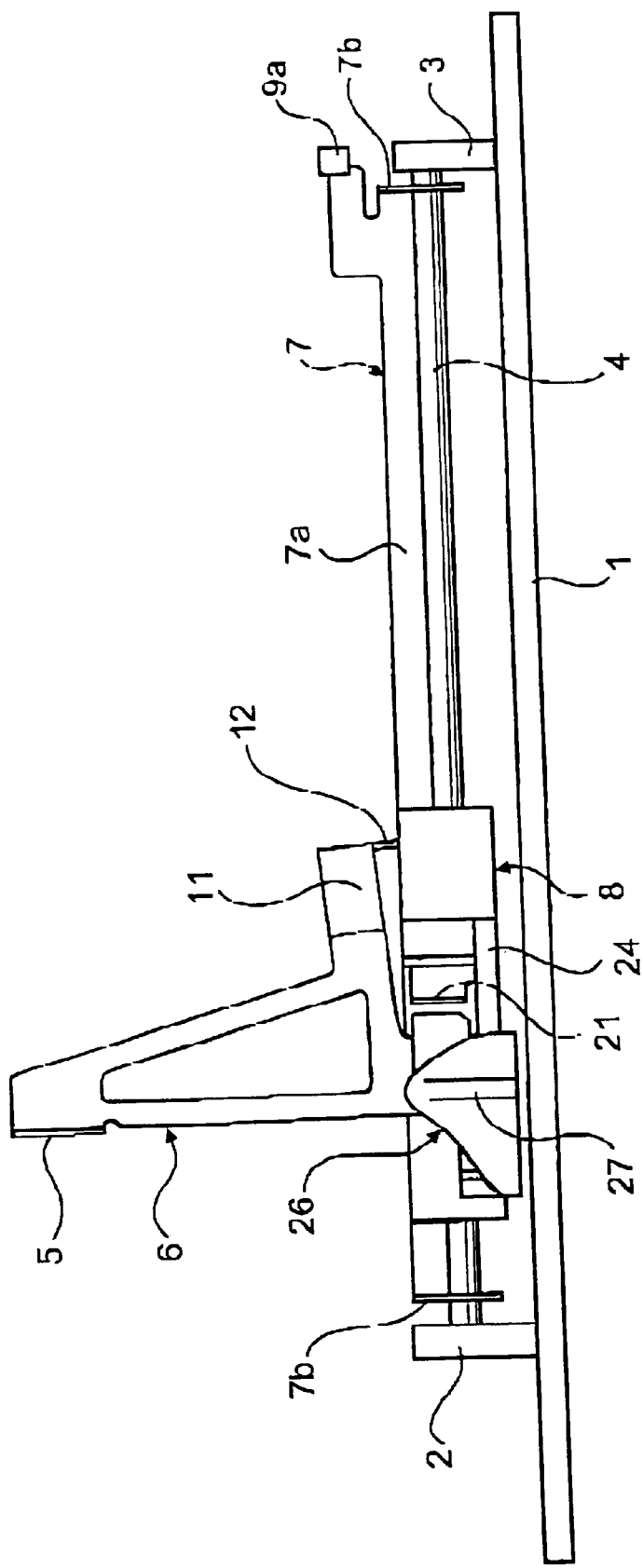
FIG. 3 shows the stapler in the direction of arrow III in FIG. 1.

The electric stapler shown in FIGS. 1–3 has a base plate 1 with a front mounting 2 and a rear mounting 3 for a metal bar 4 of circular cross-section. The bar 4 extends in the longitudinal direction of the stapler.

The object which is to be stapled, usually a sheaf of papers, is inserted into the stapler in the front part thereof, which is located in the lower part of FIGS. 1 and 2 and to the left in FIG. 3. The object is moved into abutment against an abutment surface 5 of a catch 6, whose position determines the so-called depth of stapling and which together with a yoke 7 forms the trigger mechanism of the stapler, i.e. the mechanism that releases the stapling stroke of the electric stapler. The means (not shown) which perform this stapling stroke and carry out the stapling are arranged in the front part of the stapler. These means are of prior-art type and will therefore not be described in more detail. The catch 6 is connected, pivotally about an axis perpendicular to the bar 4, to a member 8 which is displaceable along the bar 4. The catch 6 is pivotable a short distance between a front position (see FIG. 3) and a rear position.

Figure 8:
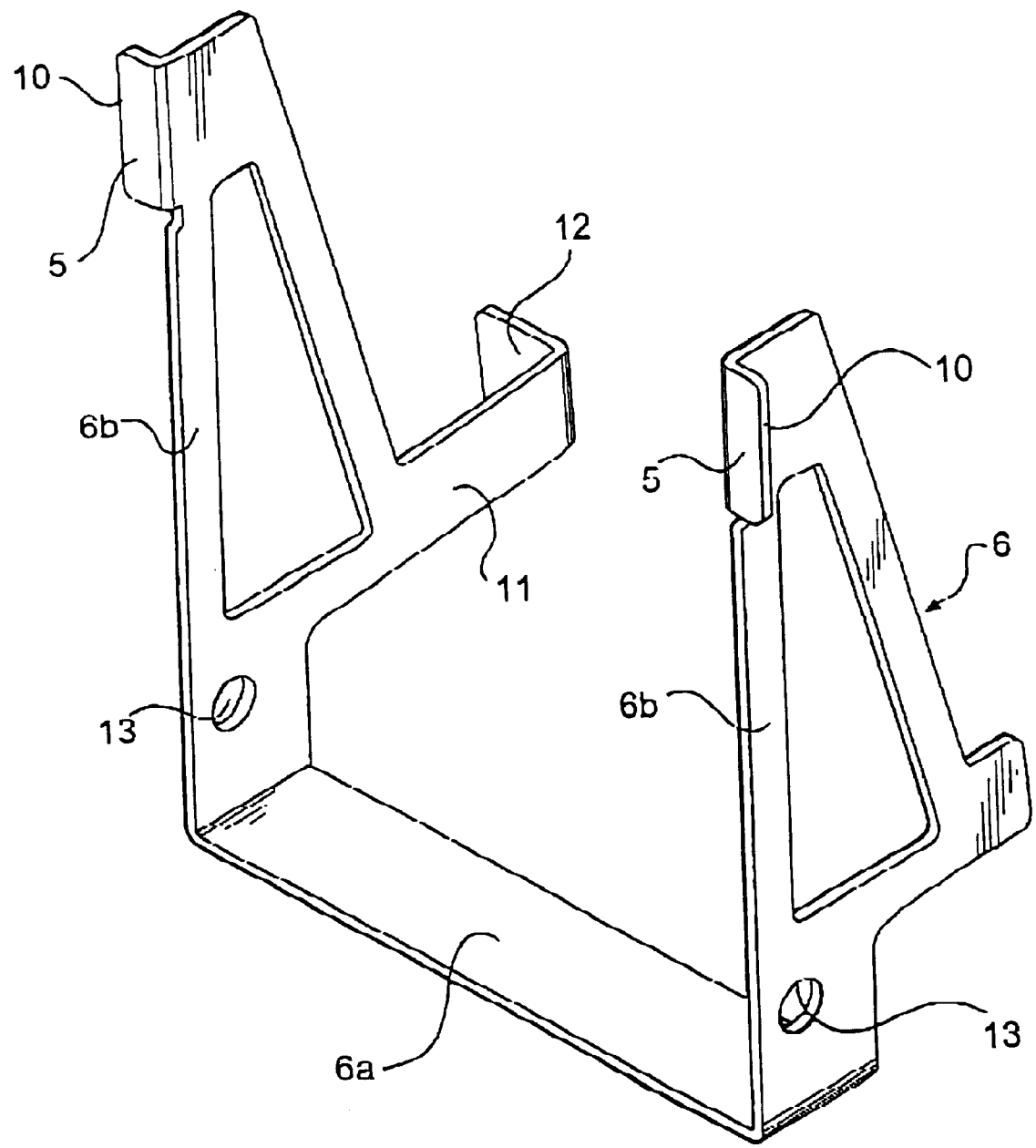
FIG. 8 is a perspective view and shows a catch arranged in the stapler.

The yoke 7 is U-shaped, its web portion 7a extending parallel with the bar 4 and its legs 7b being perpendicular thereto. The web portion 7a of the yoke 7 has a rear extension 7c forming a light-breaking means which cooperates with a photocell device 9, comprised of a transmitter 9a and a receiver 9b. The transmitter 9a emits a light ray towards the receiver 9b. The bar 4 extends through the legs 7b of the yoke 7 so that the yoke is pivotally connected to the bar 4. The yoke 7 is pivotable between an upper position (FIG. 3), in which the rear extension 7c of the yoke 7 is positioned between the transmitter 9a and the receiver 9b of the photocell device 9 and breaks the light ray between them, and a lower position, in which extension 7c is positioned below the light ray. When the yoke 7 is moved from its upper position to its lower position and its rear extension 7c is moved away from the light ray so that the light ray can reach receiver 9b, the stapling stroke of the electric stapler is immediately released by current being supplied to its drive motor. It may here be noted that the electric circuit which supplies the drive motor with this current does not comprise the catch, as is the case in e.g. prior-art staplers which are provided with the locking device according to WO 88/08932 as described by way of introduction. Nor is the yoke 7 included in this electric circuit. The yoke 7 is by means of a spring (not shown) biased towards its upper position, i.e. the position in which the light ray of the photocell device 9 is broken. The catch 6, which is shown in more detail in FIG. 8, 3 is made of a piece of sheet metal formed essentially U-shaped. The catch 6 has a substantially horizontal U web 6a and essentially vertical legs 6b. Each U leg 6b has in its upper portion a flange 10 which is bent laterally outwards. The flanges 10 jointly form the above-mentioned abutment surface 5, against which the object to be stapled is moved into abutment. One U leg 6b of the catch 6 has a backwards extending arm 11 with an outwardly bent end portion 12 which rests on an upper side of web portion 7a of yoke 7. Each U leg 6b has in its lower portion a through hole 13. The displaceable member 8 has two bearing 72 pins 14 which each extend into one of the holes 13 and define the axis about which the catch 6 is pivotally connected to the displaceable member 8. The catch 6 is pivotable a short distance between a front position (see FIG. 3), in which it is held by the yoke 7 which is spring-biased towards its upper position, by the end portion 12 of the arm 11 resting on the web portion 7a of the yoke 7, and a lower position, in which it holds the yoke 7, against the action of said spring, pressed into its lower position, i.e. the trigger position.

The member 8, which is displaceable along the bar 4 and which is made in one piece of plastic material, has in its basic form the shape or a frame, which seen from above is essentially square and has two frame parts 8a, 8b which extend parallel with the bar 4, and two frame parts 8c, 8d which extend perpendicular to the bar 4. A bridge 15, which consists of a rear part 15a of a U-shaped, downwards open cross-section, a front part 15b of a U-shaped, downwards open cross-section and an intermediate part 15c of a U-shaped, upwards open cross-section, said parts being aligned with each other, extends between the frame parts 8c, 8d which are perpendicular to the bar 4. The bar 4 extends through the bridge 15. The frame part 8b which is parallel with the bar 4 is in its front portion significantly thicker than the other frame parts 8a, 8c, 8d but is, by means of a slot 16 parallel with the bar 4, divided into two parts, viz. an inner part 8b' joined with the front frame part 8c perpendicular to the bar, and an outer part 8b'' which is press able against the inner part 8b' in an elastically yielding manner, in order to facilitate the mounting of the catch 6 on the displaceable member 8 and the dismounting of the catch from the same.

Figure 6:
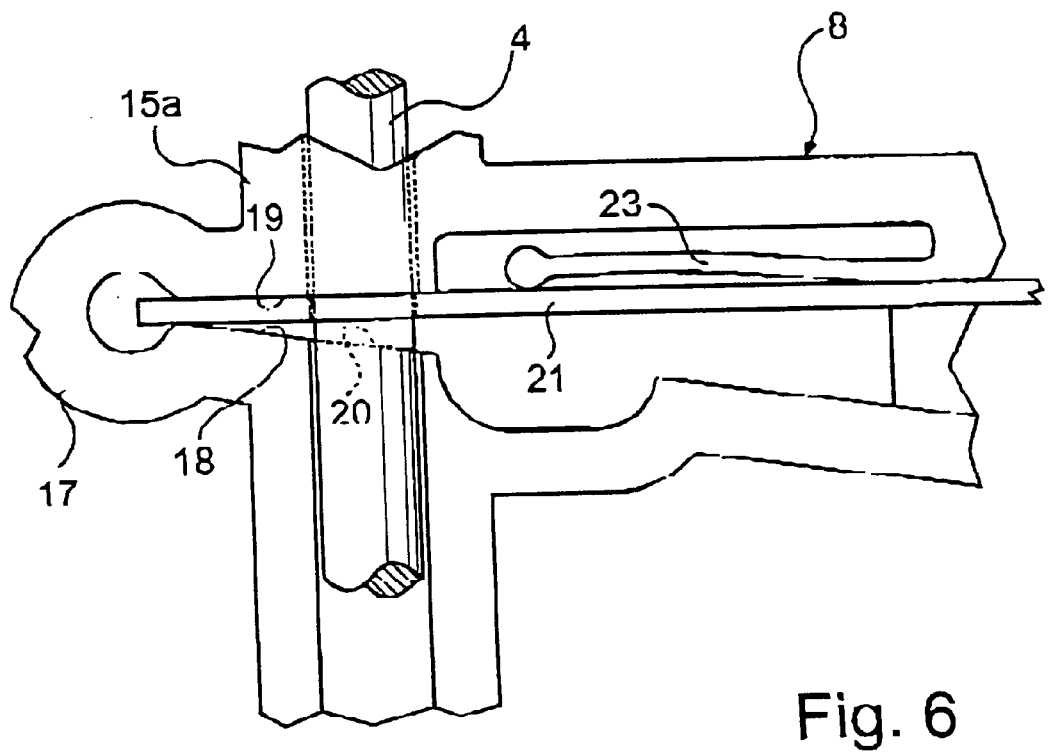
FIG. 6 is an enlarged partial view of the locking device in the position shown in FIG. 2.

A mounting 17 which is integrally formed with the frame parts 8a–8d and is in the form of a short vertical cylinder is formed between the inner part 8b' of the frame part 8b and the bridge 15 in the area of the transition between the rear part 15a of the bridge and the intermediate part 15c thereof. The mounting 17 has at its side facing the bridge 15 a vertical slot 18 whose rear boundary wall is located in the same vertical plane as the front end wall 19 of the rear bridge part 15a, said plane being perpendicular to the bar 4, and whose front boundary wall is located in the same vertical plane as the rear end wall 20 of the intermediate bridge part 15c, said plane forming an angle of about 10° to the first mentioned plane (see FIGS. 4 and 6).

Figure 4:
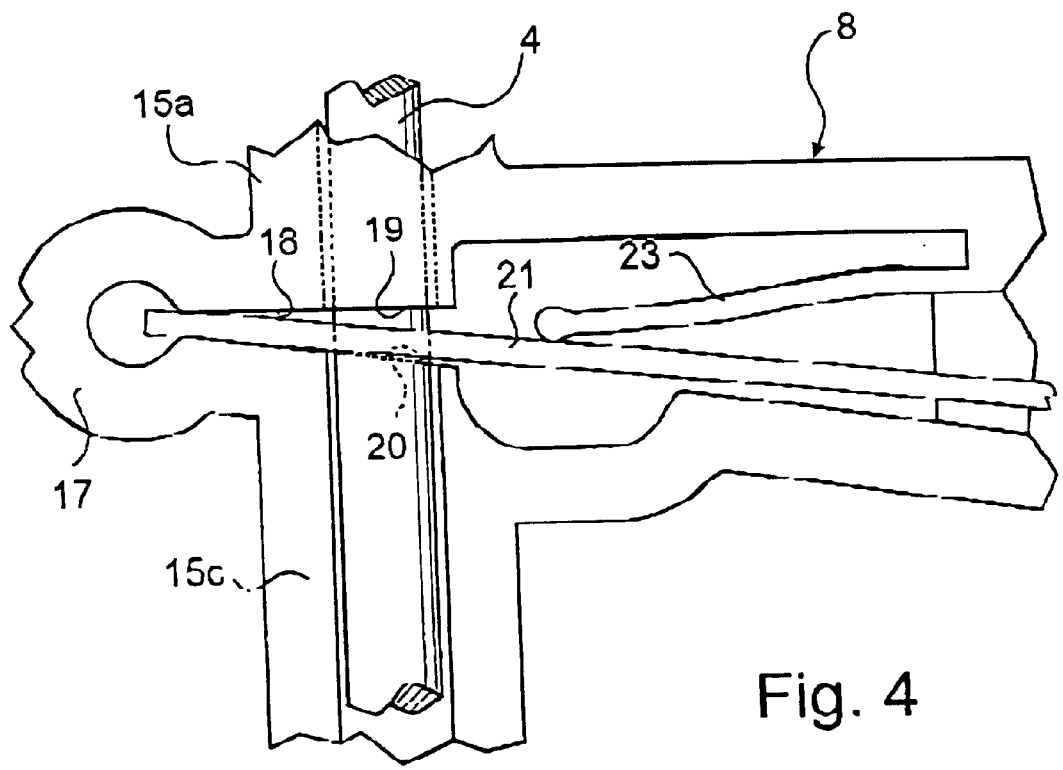
FIG. 4 is an enlarged partial view of the locking device in the position shown in FIG. 1.
Figure 5:
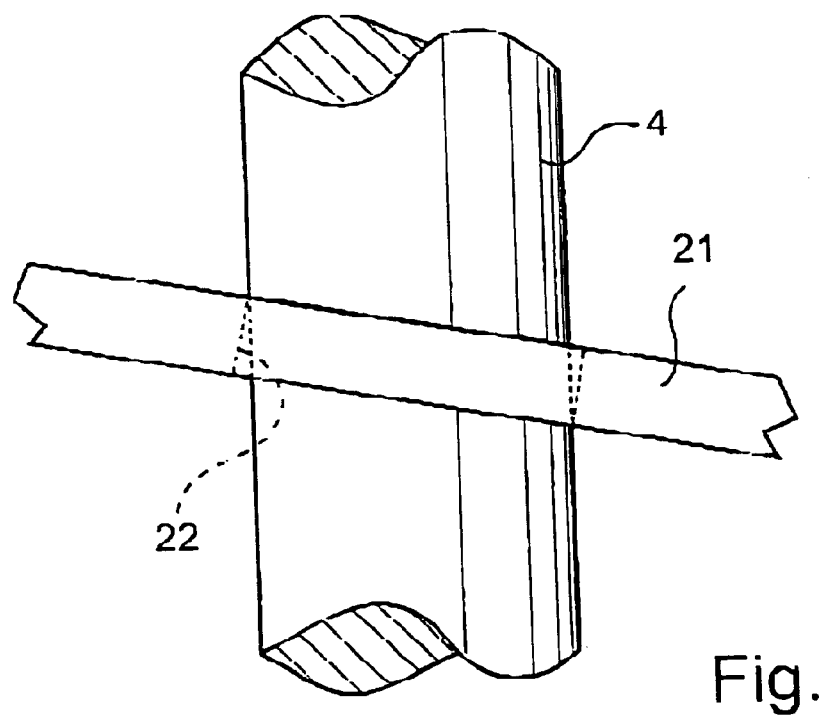
FIG. 5 shows a portion of FIG. 4 still more enlarged.
Figure 7:
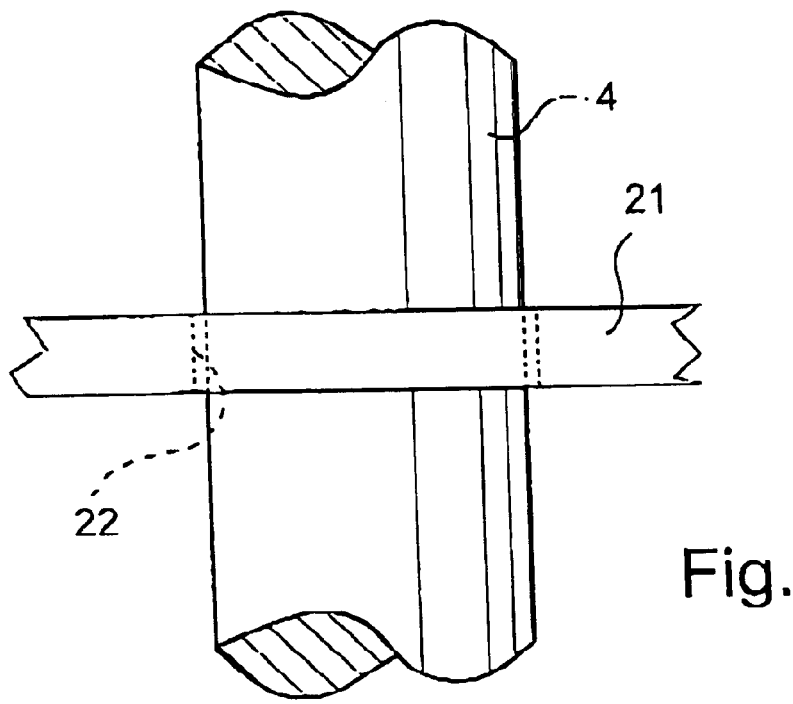
FIG. 7 shows a portion of FIG. 6 still more enlarged.

A locking means 21 which is in the form of a blade-shaped arm of metal, is at one end fixed in the slot 18 in the mounting 17. The locking means 21 has a through hole 22, whose axis extends perpendicular to the plane sides of the locking means 21 and which has a greater diameter than the bar 4. The bar 4 extends through the hole 22. The locking means 21 is tiltable along the bar 4 between the front position, pinch position (see FIGS. 4 and 5), in which the locking means portion defining the hole 22 engages the bar 4 in the manner particularly shown in FIG. 5 and pinches the locking means 21 to the bar, and a rear position, free position (see FIGS. 6 and 7) in which this hole-defining portion goes clear of the bar 4 (see especially FIG. 7). If when the locking means 21 is located in the pinch position, a force, directed forwards, i.e. downwards in FIG. 4, is exerted on the displaceable member 8, the locking means 21 is tilted, owing to the pinch, backwards relative to the bar 4, which causes this force to allow the displaceable member 8 to be displaced forwards. If, when the locking means 21 is located in the pinch position, an oppositely directed force, i.e. a rearwards directed force, is exerted on the displaceable member 8, this force strives, owing to the pinch, to tilt the locking means 21 forwards relative to the bar 4, which causes the pinch and, thus, the locking of the locking means 21 to be enhanced. The displaceable member 8 thus cannot be displaced backwards when the locking means 21 is in the pinch position. When the locking means 21 is in the free position it is, however, freely displaceable on the bar 4 both forwards and backwards. When the displaceable member 8 is displaced along the bar 4, the catch 6 is entrained, which means that the depth of stapling for the object to be stapled is changed. This depth of stapling is thus infinitely variable.

A spring tongue 23 which is integrally formed with the frame parts 8a–8d extends inwards from the frame part 8a parallel with the bar 4 and abuts with its free end against the rear of the locking means 21. The spring tongue 23 biases the locking means 21 towards its pinch position.

The frame part 8a parallel with the bar 4 is in its front lower portion formed with an outwardly projecting plate 24 which has a slot 25 parallel with the bar 4.

An operating handle 26, which is operable from the outside of the stapler, has a gripping part 27 positioned outside the base plate 1 of the stapler, a part 28 which is connected with said gripping part 27 and which extends below the plate 24 between this and the base plate 1 of the stapler, and an elongate part 29 which is connected to the part 28, and extends up through the slot 25 in the plate 24. The elongate part 29 has a front portion which is positioned in the slot 25 and a rear portion which in its entirety is positioned above the plate 24 (see FIG. 3). The operating handle 26 is displaceable to a limited extent, in relation to the displaceable member 8 and parallel with the bar 4 between a front position (FIGS. 1 and 3), in which the elongate part 29 with its front portion abuts against the front end wall of the slot 25, and a rear position (FIG. 2), in which the elongate part 29 with its rear portion abuts against the locking means 21 and keeps this in its free position. The operating handle 26 is biased by means of a spring (not shown) towards its front position.

As is obvious from that described above, it is possible to adjust the depth of stapling of the stapler by means of one hand only, which seizes the gripping part 27 of the operating handle 26 and moves the operating handle and, thus, the displaceable member 8 forwards if the depth of stapling is to be decreased, and backwards if the depth of stapling is to be increased. When the user lets go of the gripping part 26 after having increased the depth of stapling by means of the same, it is returned by the spring to its front position while at the same time the locking means 21 is returned to its pinch position by the spring tongue 23.

What I claim and desire to secure by Letters Patent is:

1. A device which is arranged in a stapler for locking a member displaceable along a bar with a forward end and a rearward end in an optional displacement position, wherein said member is provided with a catch for an object to be stapled, said device comprising:

locking means connected to the displaceable member, said locking means having a through hole through which the bar extends, said through hole having a larger diameter than the bar, said locking means being tiltable along the bar between a pinch position in which the bar is pinched within the through hole, and a free position in which the bar is not so pinched, the locking means being spring-biased towards the pinch position; and an operating handle mounted on the displaceable member and operable from outside the stapler, said operating handle being displaceable substantially parallel to the bar relative to the displaceable member between a forward position and a rearward position, wherein exerting a forward force on said operating handle while in the forward position causes the locking means to tilt toward the free position relative to the bar such that the displaceable member can move forward along the bar, and removing said forward force causes the locking means to return to the pinch position, and wherein exerting a rearward force on said operating handle while in the forward position causes the operating handle to move to the rearward position, thereby tilting the locking means toward the free position such that further rearward force exerted on the operating handle moves the displaceable member rearward along the bar, and removing rearward force from said operating handle causes the operating handle to return to the forward position and the locking means to return to the pinch position.

2. A device as claimed in claim 1, in which the locking means (21) is a blade-shaped arm, which is tiltably fixed in the displaceable member (8) at its one end and is arranged to cooperate with the operating handle (26) at its other end.

3. A device as claimed in claim 2, in which the through hole extends through the arm in a direction substantially perpendicular to sides of the arm, and the arm is substantially perpendicular to the bar when the arm is in the free position.

4. A device as claimed in claim 3, in which the arm is a piece of sheet metal.

5. A device as claimed in claim 4, in which the operating handle is displaceable relative to the displaceable member between a forward end position, in which it engages the displaceable member in order to displace the displaceable member forward, and a rearward position, in which it retains the locking means in the free position.

6. A device as claimed in claim 3, in which the operating handle is displaceable relative to the displaceable member between a forward end position, in which it engages the displaceable member in order to displace the displaceable member forward, and a rearward position, in which it retains the locking means in the free position.

7. A device as claimed in claim 6, in which the operating handle is spring-biased towards the forward position.

8. A device as claimed in claim 2, in which the arm is a piece of sheet metal.

9. A device as claimed in claim 8, in which the operating handle is displaceable relative to the displaceable member between a forward end position, in which it engages the displaceable member in order to displace the displaceable member forward, and a rearward position, in which it retains the locking means in the free position.

10. A device as claimed in claim 9, in which the operating handle is spring-biased towards the forward end position.

11. A device as claimed in claim 2, in which the operating handle is displaceable relative to the displaceable member between a forward end position, in which it engages the displaceable member in order to displace the displaceable member forward, and a rearward position in which it retains the locking means in the free position.

12. A device as claimed in claim 11, in which the operating handle is spring-biased towards the forward position.

13. A device as claimed in claim 1, in which the operating handle is displaceable relative to the displaceable member between a forward end position, in which it engages the displaceable member in order to displace the displaceable member forward, and a rearward position, in which it retains the locking means in the free position.

14. A device as claimed in claim 13, in which the operating handle is spring-biased towards the forward position.

15. A stapler having a device for positioning a catch for an object to be stapled to an optional displacement position, said device comprising:

a bar with a forward end and a rearward end, said bar extending through a through hole in a locking member, said through hole having a larger cross dimension than the bar, and the locking member being tiltable along the bar between a pinch position in which the bar is pinched within the through hole and a free position in which the bar is not so pinched, the locking member being biased toward the pinch position;

a displaceable member connected to said locking member and moveable along the bar, said catch being provided on said displaceable member; and a handle operable from outside the stapler and attached to the displaceable member, said handle being displaceable between a forward position and a rearward position, wherein a forward force exerted on said handle when said handle is in the forward position causes the locking member to tilt toward the free position, permitting forward movement of the displaceable member along the bar, and removing said forward force causes the locking member to return to the pinch position to set the displaceable member relative to the bar, and wherein a rearward force exerted on said handle when the handle is the forward position causes the handle to move to the rearward position, thereby tilting the locking member toward the free position such that further rearward force exerted on the handle moves the displaceable member rearward along the bar, and removing rearward force causes the handle to return to the forward position and the locking member to return to the pinch position such that the displaceable member is set relative to the bar.

16. The device of claim 15, wherein said through hole extends through the locking member in a direction substantially perpendicular to sides of the member, and the arm is substantially perpendicular to the bar when the member is in the free position.

17. The device of claim 15, wherein the handle is spring-biased towards the forward position.

18. The device of claim 15, wherein the locking member is comprised of sheet metal.

* * * * *